(12) United States Patent
Clerici et al.

(10) Patent No.: US 9,813,165 B2
(45) Date of Patent: Nov. 7, 2017

(54) METHOD AND SYSTEM FOR GENERATING AND TRANSMITTING TERAHERTZ

(71) Applicant: INSTITUT NATIONAL DE LA RECHERCHE SCIENTIFIQUE, Quebec (CA)

(72) Inventors: Matteo Clerici, Scotland (GB); Anna Mazhorova, Verdun (CA); Manoj Mridha, Longueuil (CA); Yoann Jestin, Montreal (CA); Roberto Morandotti, Montreal (CA)

(73) Assignee: INSTITUT NATIONAL DE LA RECHERCHE SCIENTIFIQUE, Quebec, Quebec (CA)

( * ) Notice: Subject to any disclaimer, the term of this patent is extended or adjusted under 35 U.S.C. 154(b) by 0 days.

(21) Appl. No.: 15/313,621

(22) PCT Filed: May 21, 2015

(86) PCT No.: PCT/CA2015/050460
§ 371 (c)(1),
(2) Date: Nov. 23, 2016

(87) PCT Pub. No.: WO2015/179970
PCT Pub. Date: Dec. 3, 2015

(65) Prior Publication Data
US 2017/0187470 A1  Jun. 29, 2017

Related U.S. Application Data

(60) Provisional application No. 62/002,983, filed on May 26, 2014.

(51) Int. Cl.
*H04B 10/00* (2013.01)
*H04B 10/90* (2013.01)
*H04J 14/00* (2006.01)

(52) U.S. Cl.
CPC .................................. *H04B 10/90* (2013.01)

(58) Field of Classification Search
CPC ............................... H04B 10/30; H04B 10/90
See application file for complete search history.

(56) References Cited

U.S. PATENT DOCUMENTS

| 2008/0023633 A1 | 1/2008 | Mittleman et al. |
| 2012/0097850 A1* | 4/2012 | Darcie ................. G01J 3/0205 250/340 |

OTHER PUBLICATIONS

S.P. Jamison et al., Single-mode waveguide propagation and reshaping of sub-ps terahertz pulses in sapphire fibers, Applied Physics Letters, Apr. 2000, pp. 1987-1989, vol. 76, No. 15, AIP Publishing, U.S.A.

(Continued)

*Primary Examiner* — Daniel Dobson

(57) ABSTRACT

A method and a system for generating terahertz signals, the system comprising a pump source, a two-wire waveguide; and at least one terahertz source, wherein the terahertz source is embedded within the two-wire waveguide and the pump source is configured to illuminate the terahertz source, the terahertz source generating terahertz signals directly within the two-wire waveguide. A terahertz source, embedded within a two-wire waveguide, said source being configured to be illuminated within the two-wire waveguide with a pump source for generating terahertz signals directly inside the two-wire waveguide. A two-wire waveguide system is thus provided, comprising a two-wire waveguide and a terahertz source embedded between the wires of the two-wire waveguide and configured to be illuminated within the two-wire waveguide with a pump source for generating terahertz signals directly inside the two-wire waveguide.

20 Claims, 5 Drawing Sheets

(56) References Cited

OTHER PUBLICATIONS

R. Mendis et al., Plastic ribbon THz waveguides, Journal of Applied Physics, Oct. 2000, pp. 4449-4451, vol. 88, No. 7, AIP Publishing, U.S.A.
Mathieu Rozé et al., Suspended core subwavelength fibers: towards practical designs for low-loss terahertz guidance, Optics Express, May 2011, pp. 9127-9138, vol. 19, No. 10, OSA Publishing, U.S.A.
Li-Jin Chen et al., Low-loss subwavelength plastic fiber for terahertz waveguiding, Optics Letters, Feb. 2006, pp. 308-310, vol. 31, No. 3, OSA Publishing, U.S.A.
Kanglin Wang et al., Metal wires for terahertz wave guiding, Nature International Journal of Science, Nov. 2004, pp. 376-379, vol. 432, Nature Publishing Group, U.S.A.
Tae-In Jeon et al., THz Sommerfeld wave propagation on a single metal wire, Applied Physics Letters, 2005, pp. 161904-1 to 161904-3, vol. 86, AIP Publishing, U.S.A.
R. Mendis et al., THz Interconnect with Low-Loss and Low-Group Velocity Dispersion, IEEE Microwave and Wireless Components Letters, Nov. 2001, pp. 444-446, vol. II, No. 11, IEEE Publishing, U.S.A.
Marx Mbonye et al., A terahertz two-wire waveguide with low bending loss, Applied Physics Letters, 2009, pp. 233506-1 to 233506-3, vol. 95, AIP Publishing, U.S.A.
Hamid Pahlevaninezhad et al., Coupling of terahertz waves to a two-wire waveguide, Optics Express, Oct. 2010, pp. 22614-22624, vol. 18, No. 22, OSA Publishing, U.S.A.
Hamid Pahlevaninezhad et al., Two-wire waveguide for terahertz, Optics Express, Mar. 2010, pp. 7415-7420, vol. 18, No. 7, OSA Publishing, U.S.A.
P. Tannouri et al., Quasi-TEM mode propagation in twin-wire THz waveguides, Chinese Optics Letters, Nov. 2011, pp. 110013-1 to 110013-4, vol. 9, Chinese Laser Press, China.
Jessienta Anthony et al., Hybrid hollow core fibers with embedded wires as THz waveguides, Optics Express, Feb. 2013, pp. 2903-2912, vol. 21, No. 3, OSA Publishing, U.S.A.
Andrey Markov et al., Two-wire terahertz fibers with porous dielectric support, Optics Expess, May 2013, pp. 12828-12743, vol. 21, No. 10, OSA Publishing, U.S.A.
Shaghik Atakaramians et al., Terahertz dieletric waveguides, Advances in Optics and Photonics, 2013, pp. 169-215, vol. 5, OSA Publishing, U.S.A.
Jason A. Deibel et al., Enhanced coupling of terahertz radiation to cylingrical wire waveguides, Optics Express, Jan. 2006, p. 279-290, vol. 14, No. 1, OSA Publishing, U.S.A.
Manoj K. Mridha et al., Low Dispersion Propagation of Broadband THz Pulses in a Two-Wire Waveguide, Conference on Lasers and Electro-Optics, Technical Digest (CD) (Optical Society of America, 2013), paper. CTh1K.6, U.S.A.
Peter R. Smith et al., Subpicosecond Photoconducting Dipole Antennas, IEEE Journal of Quantum Electronics, Feb. 1988, pp. 255-260, vol. 24, No. 2, IEEE Publishing, U.S.A.
Q. Wu et al., Broadband detection capability of ZnTe electrooptic field detectors, Applied Physics Letters, May 1996, pp. 2924-2926, vol. 68, No. 21, AIP Publishing, U.S.A.
Manoj K. Mridha et al., Active terahertz two-wire waveguides, Optics Express, Sep. 2014, pp. 22340-22348, vol. 22, No. 19, OSA Publishing, U.S.A.

\* cited by examiner

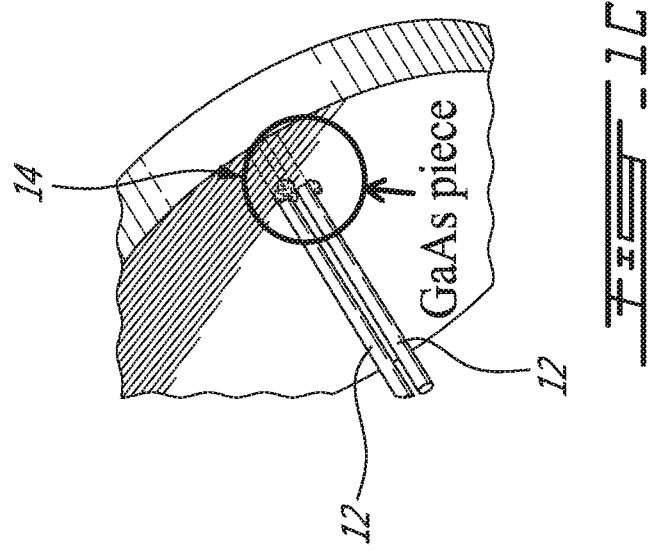

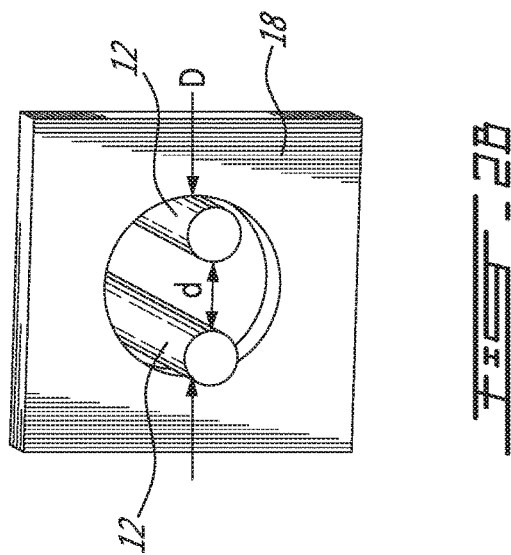
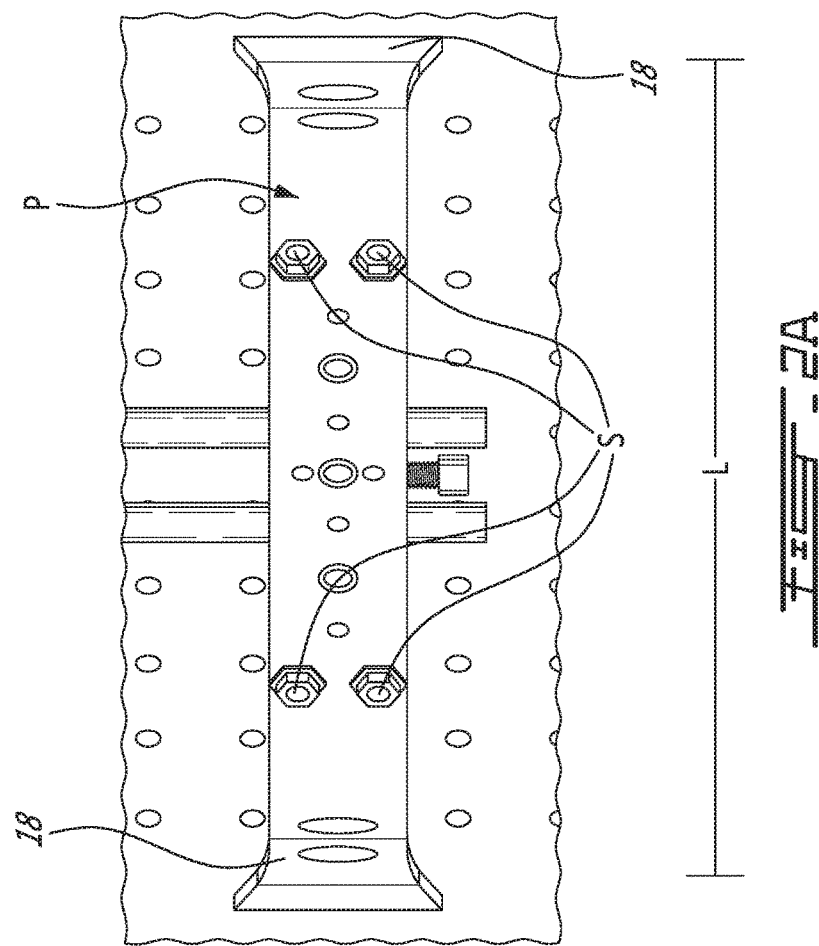

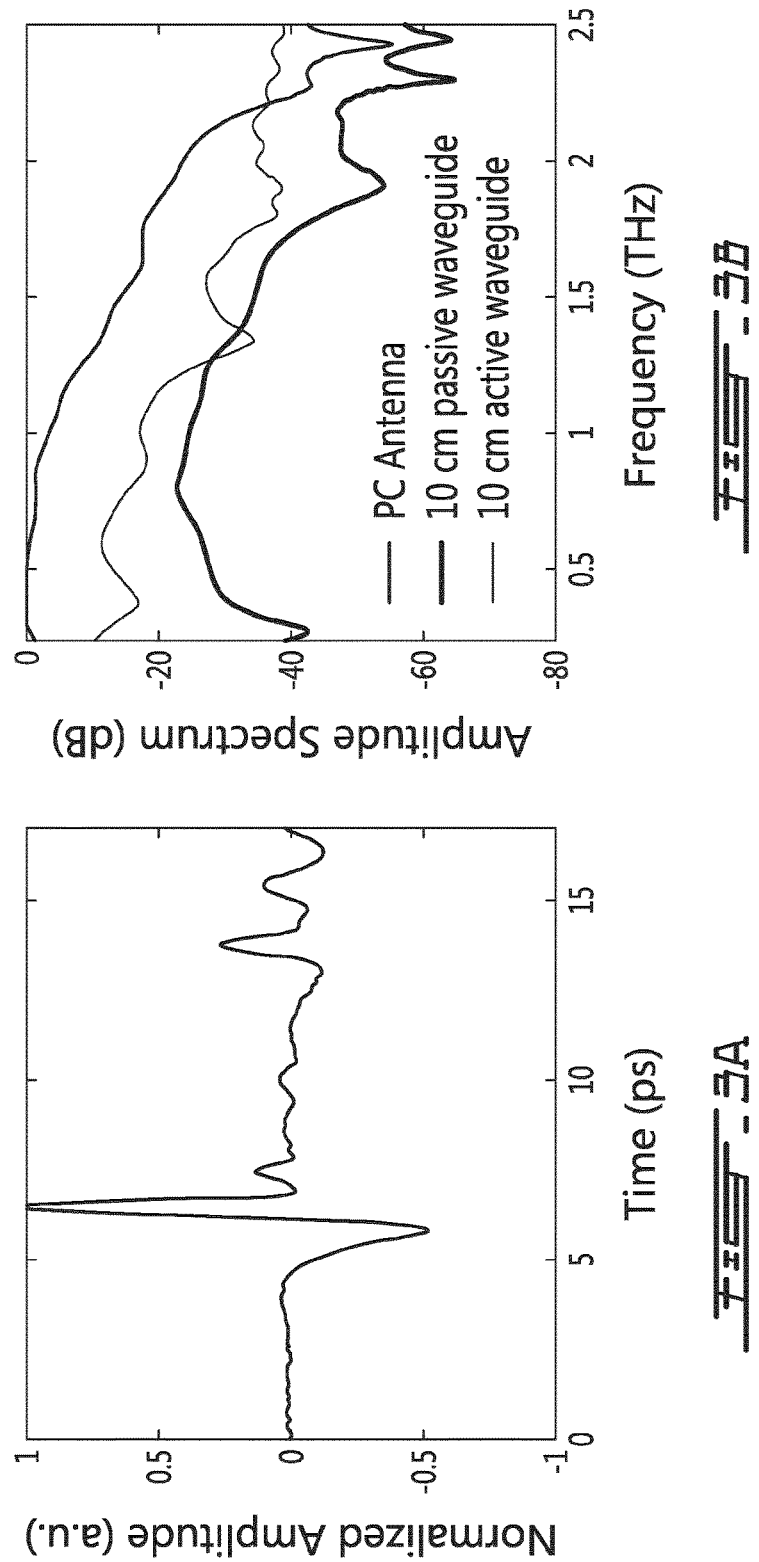

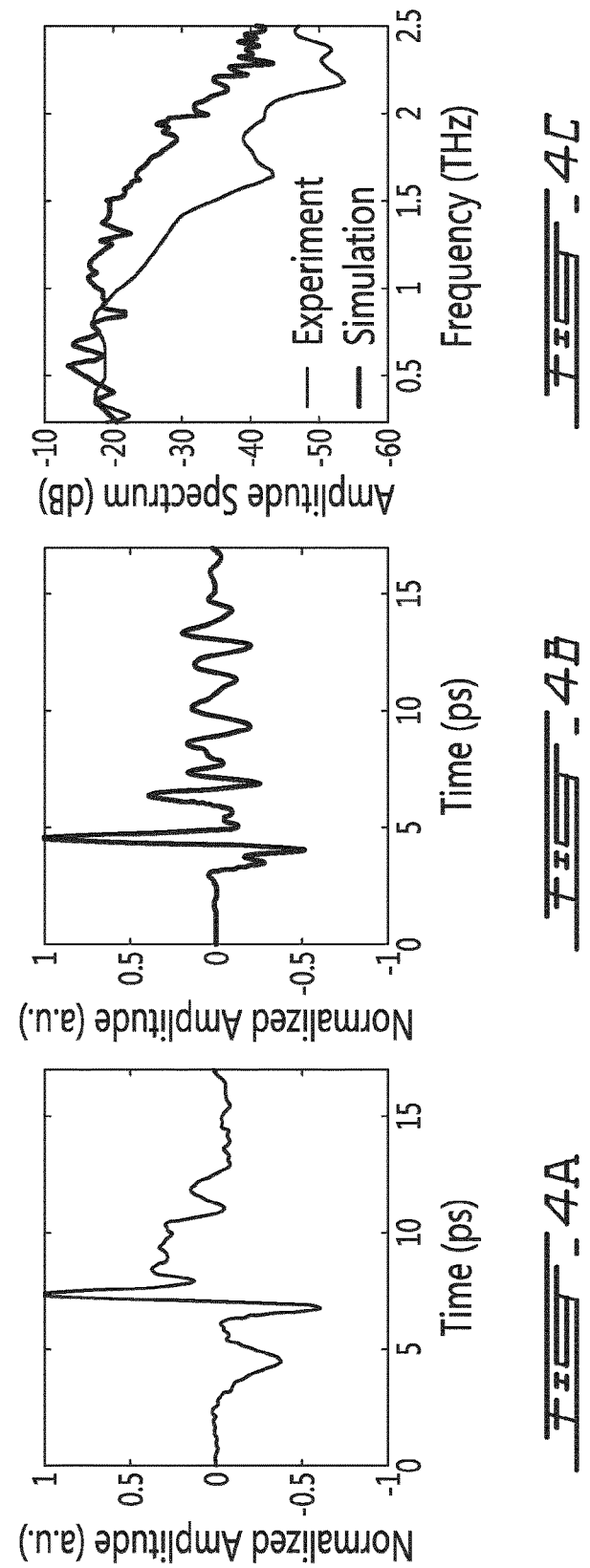

METHOD AND SYSTEM FOR GENERATING AND TRANSMITTING TERAHERTZ

CROSS-REFERENCE TO RELATED APPLICATIONS

This application is a is a National Entry Application of PCT application no CA/2015/050460 filed on May 21, 2015 and published in English under PCT Article 21(2) as WO 2015 179970, which itself claims benefit of U.S. provisional application Ser. No. 62/002,983, filed on May 26, 2014. All documents above are incorporated herein in their entirety by reference.

FIELD OF THE INVENTION

The present invention relates to Terahertz (THz) technologies. More specifically, the present invention is concerned with a method and system for generating and transmitting Terahertz.

BACKGROUND OF THE INVENTION

Terahertz (THz) technologies open great potential in a number of fields, such as spectroscopy, material science, security screening and high-speed wireless communication for example.

The development of waveguides with low dispersion propagation of broadband THz pulses as well as low losses at frequencies above 1 THz is essential to enable undistorted propagation of sub-picosecond pulses and to realize interconnections for future THz communication network, enhanced THz-time spectroscopy (TDS) and sensing technology. Choosing the appropriate material and the suitable geometry for the fabrication of THz waveguides is becoming a main challenge. Furthermore, depending on the geometry, efficient coupling of broadband propagating THz waves to the waveguide can be an issue due to a large mismatch between the mode of the waveguide and the free propagating incident mode.

To date, several THz waveguides have been reported based on dielectric and metallic structures. On the one hand, dielectric based waveguides such as sapphire fibers [1], plastic ribbon waveguides [2] and subwavelength fibers [3, 4] have been developed. On the other hand, metallic waveguides such as single wire waveguides [5, 6], parallel plate waveguides (PPWG) [7] and two-wire waveguides [8-11] can propagate single cycle THz pulses with low dispersion due to their ability to support an almost non-dispersive transverse electromagnetic mode (TEM).

The linearly polarized TEM mode of a two-wire waveguide can be easily excited via a photoconductive (PC) antenna and is characterized by low bending losses, in contrast to single wire waveguides [8]. In addition, a two-wire waveguide provides a tight two-dimensional confinement of the TEM mode and can thus be employed for guiding over longer distances. Recently, a metal-dielectric air-core fiber with two embedded indium wires [12] and a two-wire waveguide structure supported by porous dielectric fibers [13] have been demonstrated experimentally and theoretically, respectively.

In most of the cases, dielectric waveguides are not suitable because of their low dispersion propagation of THz pulses due to the inherent dispersive properties and losses at frequencies above 1 THz. Although hollow core dielectric fibers can boost low-loss and low-dispersion, they are limited in bandwidth due to resonance or bandgap effects [14].

Single wire waveguides carrying radially polarized TEM modes are difficult to excite from commonly available linearly polarized THz sources like PC antennas due to mode mismatch and hence it is necessary to make use of a radially polarized THz radiation source [15]. Furthermore, single-wire waveguides are characterized by high bending losses, which limit their flexibility. Although the low dispersion modes of parallel plate waveguides (PPWG) can be conveniently excited by a commonly available PC antenna, such waveguides cannot be used for long propagation distances. This is due to the one dimensional THz confinement in these waveguides which leads to beam expansion in the unguided dimension, and hence subsequent loss due to diffraction.

Despite the promising results obtained with two wire waveguides, one issue that still needs to be addressed is how to efficiently couple THz pulses into the two-wire guiding structure.

Both the TEM mode supported by a two-wire waveguide and the THz radiation generated by a PC antenna are linearly polarized. The combined system consisting of a PC antenna interconnected with a two-wire waveguide is therefore a very effective solution for the efficient generation, coupling and routing of the THz signal. In earlier work [8, 16], the two-wire waveguide mode was excited by approaching a PC antenna close to the input of the waveguide. In this configuration, it can be assumed that the THz radiation is being coupled into the waveguide from free space, similar to the coupling demonstrated numerically in [9] by considering a single dipole source. However, a large fraction of this free space THz radiation, emitted by the PC antenna, is not coupled into the waveguide and the low, far-field mediated coupling efficiency of the system strongly limits its applicability. The main limiting factor is the difficulty of focusing the THz radiation at the input of the two-wire waveguide as the size of the gap between the wires is close to the diffraction limit.

There is still a need in the art for a method and system for transmitting Terahertz.

SUMMARY OF THE INVENTION

More specifically, in accordance with the present invention, there is provided a system for generating terahertz signals, comprising a pump source, a two-wire waveguide; and at least one terahertz source, wherein the terahertz source is embedded within the two-wire waveguide and the pump source is configured to illuminate the terahertz source, the terahertz source generating terahertz signals directly within the two-wire waveguide.

There is further provided a method for generating terahertz signals, comprising embedding a terahertz source between wires of a two-wire waveguide, and illuminating the terahertz source within the waveguide with a pump source, thereby generating terahertz signals directly inside the two-wire waveguide.

There is further provided a terahertz source embedded within a two-wire waveguide, the source being configured to be illuminated within the two-wire waveguide with a pump source for generating terahertz signals directly inside the two-wire waveguide.

There is further provided a two-wire waveguide system, comprising a two-wire waveguide and a terahertz source embedded between the wires of two-wire waveguide and configured to be illuminated within the two-wire waveguide with a pump source for generating terahertz signals directly inside the two-wire waveguide.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1C is a photograph of the active waveguide of FIG. 1B;

FIG. 2A shows a support for the systems of FIGS. 1A and 1B;

FIG. 2B is a schematic view of a dielectric holder of the support of FIG. 2A;

FIG. 3A shows a measured temporal waveform from a GaAs element used as a photoconductive antenna, normalized to its peak;

FIG. 3B show the measured amplitude spectra of a passive waveguide system (top curve), of a 10 cm waveguide (bottom curve) and of a 10 cm long active waveguide system according to an embodiment of the present invention (middle curve), normalized to peak of the PC antenna's spectrum;

FIG. 4A shows the measured THz waveform of a 20 cm long active waveguide system according to an embodiment of the present invention, normalized to its peak;

FIG. 4B shows the simulated THz waveform of a 20 cm long active waveguide system according to an embodiment of the present invention, normalized to its peak; and FIG. 4C shows the amplitude spectra of the measured and simulated THz waveform, normalized to the peak of the spectrum of the photoconductive antenna.

DESCRIPTION OF ILLUSTRATIVE EMBODIMENTS

Figure 1A:
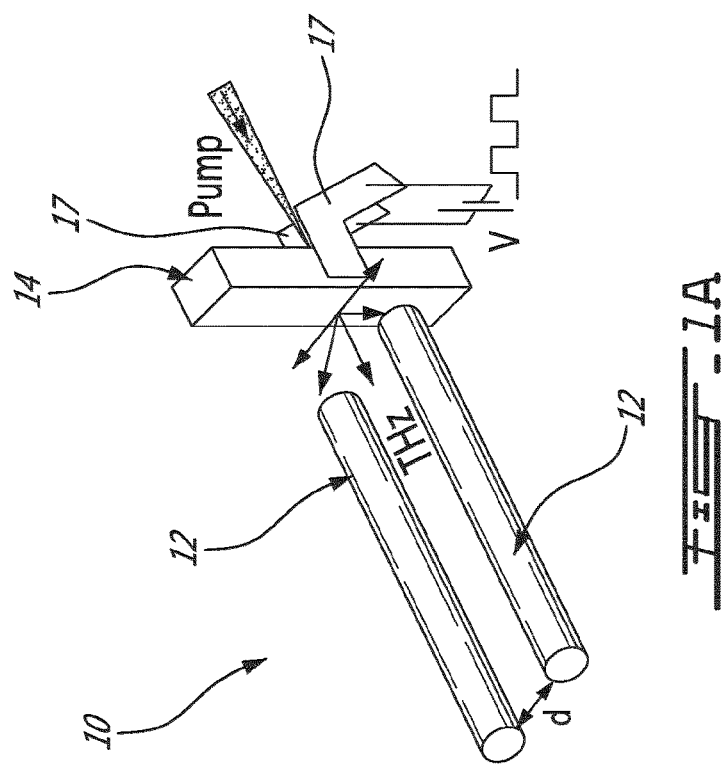
FIG. 1A is a schematic view of a passive waveguide system.

The present invention is illustrated in further details by the following non-limiting examples.

Experiments were conducted to compare generation and coupling of THz radiation in passive and active configurations, i.e. using a passive waveguide system 10 comprising a photoconductive antenna 14 as a THz source, coupled to a two-wire waveguide 10 (see FIG. 1A), and an active waveguide system comprising the photoconductive antenna 14 inserted between the wires 12 of the two-wire waveguide 100, (FIGS. 1B, 1C), connected to a voltage source. The system of FIG. 1B thus allows for THz generation directly inside the two-wire waveguide 12; it is referred to as two-wire waveguide-based transmitter (TWT).

In both passive and active configurations, the wires 12 of the two-wire waveguide is straight and parallel and made in a conductive material such as copper for example, the photoconductive antenna 14 is made in GaAs, or other another semi-insulating semi-conductor such as InGaAs, AlGaAs, InP or SiC for example, and a short laser pulse is shined on the photoconductive antenna 14.

In this embodiment, the two-wire waveguide comprises two wires in a conductive material, such as copper for example, each of a diameter comprised in a range between 200 to 350 micrometers, for example of 250 µm, with a wire separation (d) in free space ranging from 200 to 400 micrometers, i.e. for example of 300 µm.

As shown in FIG. 2A, the two-wire waveguide structure may be supported by an aluminum base plate (P). Two dielectric slabs 18 are attached to either ends of the base plate (P). As best seen in FIG. 2B, each dielectric slab 18 comprises a hole of a diameter (D) 800 µm drilled through its center. These holes support the two wires 12 passing therethrough with a separation distance (d) between the two wires ranging from 200 to 400 micrometers, i.e. for example of 300 µm. Screws (S) may be used for applying tension on the wires 12. The two wires 12 are drawn and wrapped around the screws in order to apply tension and hold the wires 12 straight. The total length (L) of the waveguide can have a range between 5 and 30 cm.

As illustrated in FIG. 1A, in the passive waveguide system, the two wires 12 are coupled to the photoconductive antenna 14, which is positioned as close as possible to the copper wires 12 at a first end thereof, its position being adjusted in order to get an optimized coupling between the photoconductive antenna 14 and the waveguide 12, i.e. to yield an optimized signal at the opposite end of the waveguide 12. The electric field required for activating the photoconductive antenna 14 is obtained by applying a bias to copper electrodes 17 connected to the photoconductive antenna 14. The photoconductive antenna 14 then radiates like a dipole with a corresponding typical radiation pattern, shown for simplification with arrows only indicating the radiation pattern that is transmitted through the waveguide.

Figure 1B:
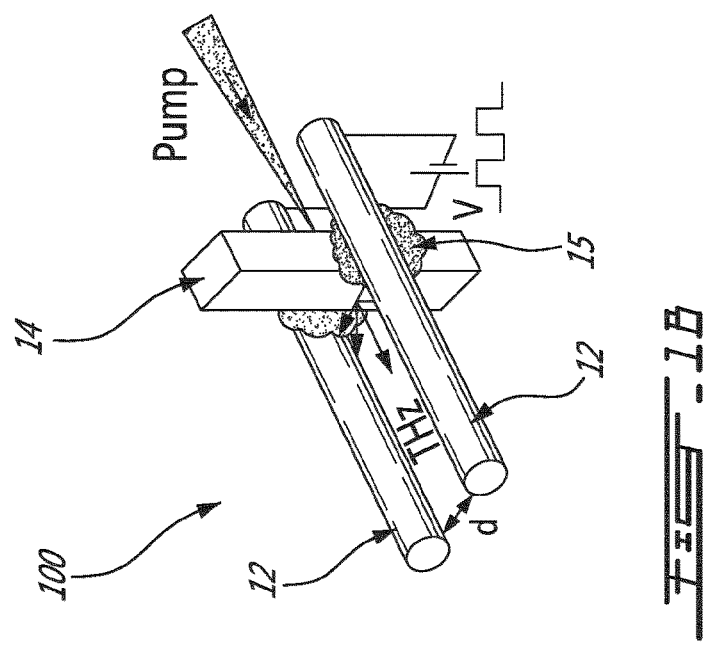
FIG. 1B is a schematic view of an active waveguide system.

FIG. 1B illustrates the active waveguide system 100, comprising the same two-wire waveguide as in the passive system of FIG. 1A. The photoconductive antenna 14 is the same, i.e. a thin rectangular piece of GaAs (GaAs, 300 µm×300 µm×5 mm). However, it is held between the two wires 12. Silver paint 15 is applied at the junction of the thin rectangular piece of GaAs and the wires to ensure a good electrical contact therebetween. The electric bias required for activating the photoconductive antenna 14 integrated within the waveguide 12 is obtained by applying a voltage directly to the copper wires 12, i.e. the wires 12 are connected to a modulated, bipolar high voltage source V able to supply up to 1000V. As in the case of FIG. 1A, the two-wire waveguide 12 is illuminated by femtosecond pulses, i.e. pulses from tens of fs to hundreds of fs, for example pulses in a range between 10 fs and 500 fs, from the pump source. Arrows indicate direction of THz emission, which occurs directly in the plane containing the two wires 12, the THz radiation being thus directly coupled into the waveguide 12. In this system 100, both the generation and the coupling of the THz radiation occur directly inside the two-wire waveguide 12.

FIG. 1C is a photograph of the active waveguide 100, the black circle highlighting the GaAs element 14 inserted in between the two wires 12.

The emission of the GaAs element 14, placed between the two electrodes 17 and used as a photoconductive antenna, is measured in the system of FIG. 1A. The THz emission is then coupled into the two-wire waveguide 10 of length 10 cm as discussed in [3], and the coupling efficiency and guided bandwidth is determined. The results are then compared with the active system of FIG. 1B, where the GaAs element 14 is directly placed inside the two-wire waveguide 12 of the same dimensions. In all cases the GaAs element 14 was illuminated with a Ti:Sapphire mode locked laser (Mai-Tai, Spectra-Physics) with 80 MHz repetition rate, 125 fs pulse duration and 220 mW average power (Pump in FIGS. 1A and 1B). In order to generate the THz radiation, the same square wave voltage (110 V, 11 kHz) was applied on the GaAs element 14. Finally, the temporal profile of the THz signal was measured using the electro-optical sampling technique [4], using a 2 mm thick ZnTe crystal.

FIG. 3A shows the reference THz waveform as emitted by the PC antenna normalized to its peak.

FIG. 3B shows the measured amplitude spectra of the signals obtained from both configurations, i. e. the passive system of FIG. 1A and the active system of FIG. 1B. The energy of the output pulses, normalized to the energy of the PC antenna 14, was extracted from the measured temporal profiles. It was found that the pulse energy for the 10 cm long waveguide of FIG. 1A and for the active waveguide system of FIG. 1B were nearly 0.63% and 40.05% of the pulse energy of the PC antenna 14, respectively, showing that the active waveguide system couples a THz signal 63 times stronger than the passive waveguide system. In order to estimate the propagation losses of the active waveguide system, the normalized output energy of the 10 cm long active waveguide system was compared with a 20 cm long equivalent active waveguide system and it was found that the additional 10 cm of waveguide added 11 dB of loss.

FIG. 4 show both the experimentally observed (FIG. 4A), and the numerically evaluated (FIG. 4B) output waveforms for the 20 cm long active waveguide system, both normalized to their peaks, while their respective amplitude spectra (top curve: simulation, bottom curve: experimental) is shown in FIG. 4C, normalized to the peak of the antenna's spectrum. The comparison shows a fair agreement between the simulation and the experimental results.

The results show that the coupling of THz radiation into a two-wire waveguide mode is significantly improved, for example more than 63 times as described hereinabove, by using an active waveguide system as illustrated for example in FIG. 1B, in which the THz source is directly embedded within the guided mode structure, i.e. the generation of the THz signal occurs directly inside the guiding structure formed by the two wires of the two-wire waveguide.

Alternatively, the THz radiation may be generated by optical rectification in a non-linear medium such as <100>, <110> and <111> oriented crystals with a Zinc blende structure commonly displayed by most III-V and some II-VI semiconductors like GaAs, CdTe, InP, InAs, ZnTe etc. . . . , or an inorganic electro-optic crystal such as $LiNbO_3$ or an organic electro-optic crystal such as Dimethyl Amino Sulfur Trifluoride (DAST), inserted between the two wires of the two-wire waveguide as described hereinabove. In this case, the system does not need a voltage source to apply a bias on conductive wires of the two-wire waveguide.

There is thus provided an active two-wire waveguide operating in the terahertz (THz) range of wavelengths by generating a THz electric field directly within the guiding structure.

The scope of the claims should not be limited by embodiments set forth in the examples, but should be given the broadest interpretation consistent with the description as a whole.

REFERENCES

1. S. P. Jamison, R. W. McGowan, and D. Grischkowsky, "Single-mode waveguide propagation and reshaping of sub-ps terahertz pulses in sapphire fibers," Appl. Phys. Lett. 76, 1987-1989 (2000).
2. R. Mendis, and D. Grischkowsky, "Plastic ribbon THz waveguides," J. of Appl. Phys. 88, 4449-4451 (2000).
3. M. Rozé, B. Ung, A. Mazhorova, M. Walther, and M. Skorobogatiy, "Suspended core subwavelength fibers: towards practical designs for low-loss terahertz guidance," Opt. Express 19, 9127-9138 (2011).
4. L. J. Chen, H. W. Chen, T. F. Kao, J. Y. Lu, and C. K. Sun, "Low-loss subwavelength plastic fiber for terahertz waveguiding," Opt. Lett. 31, 308-310 (2006).
5. K. Wang, and D. M. Mittleman, "Metal wires for terahertz wave guiding," Nature 432, 376-379 (2004).
6. T.-I. Jeon, J. Zhang, and D. Grischkowsky, "THz Sommerfeld wave propagation on a single metal wire," Appl. Phys. Lett. 86, 161904-161903 (2005).
7. R. Mendis, and D. Grischkowsky, "THz interconnect with low-loss and low-group velocity dispersion," IEEE Microw. Wireless Compon. Lett. 11, 444-446 (2001).
8. M. Mbonye, R. Mendis, and D. M. Mittleman, "A terahertz two-wire waveguide with low bending loss," Appl. Phys. Lett. 95, 233506-233503 (2009).
9. H. Pahlevaninezhad, and T. E. Darcie, "Coupling of terahertz waves to a two-wire waveguide," Opt. Express 18, 22614-22624 (2010).
10. H. Pahlevaninezhad, T. E. Darcie, and B. Heshmat, "Two-wire waveguide for terahertz," Opt. Express 18, 7415-7420 (2010).
11. P. Tannouri, M. Peccianti, P. L. Lavertu, F. Vidal, and R. Morandotti, "Quasi-TEM mode propagation in twin-wire THz waveguides (Invited Paper)," Chin. Opt. Lett. 9, 110013/1-110013/4 (2011).
12. J. Anthony, R. Leonhardt, and A. Argyros, "Hybrid hollow core fibers with embedded wires as THz waveguides," Opt. Express 21, 2903-2912 (2013).
13. A. Markov, and M. Skorobogatiy, "Two-wire terahertz fibers with porous dielectric support," Opt. Express 21, 12728-12743 (2013).
14. S. Atakaramians, S. Afshar V, T. M. Monro, and D. Abbott, "Terahertz dielectric waveguides," Adv. Opt. Photon. 5, 169-215 (2013).
15. J. A. Deibel, K. Wang, M. D. Escarra, and D. Mittleman, "Enhanced coupling of terahertz radiation to cylindrical wire waveguides," Opt. Express 14, 279-290 (2006).
16. M. K. Mridha, A. Mazhorova, M. Daneau, M. Clerici, M. Peccianti, P.-L. Lavertu, X. Ropagnol, F. Vidal, and R. Morandotti, "low dispersion propagation of broadband THz pulses in a two-wire waveguide," *Conference on Lasers and Electro-Optics*, Technical Digest (CD) (Optical Society of America, 2013), paper. CTh1K.6.
17. P. R. Smith, D. H. Auston, and M. C. Nuss, "Subpicosecond photoconducting dipole antennas," IEEE J. Quantum Electron. 24, 255-260 (1988).
18. Q. Wu et al., "Broadband Detection Capability of ZnTe Electro-optic Field Detectors," Appl. Phys. Lett. 68, 2924-2926 (1996).
19. US 2012/0097850

The invention claimed is:

1. A system for generating terahertz signals, comprising:
   a pump source;
   a two-wire waveguide; and
   at least one terahertz source;
   wherein said terahertz source is embedded within the two-wire waveguide and said pump source is configured to illuminate said terahertz source, said terahertz source generating terahertz signals directly within the two-wire waveguide.
2. The system of claim 1, wherein said two-wire waveguide comprises two wires in a conductive material, said terahertz source is a photoconductive antenna, and said system further comprises a voltage source adapted to apply a bias to said wires.

3. The system of claim 1, wherein said terahertz source is a non-linear material.

4. The system of claim 1, wherein said terahertz source is one of: an electro-optic organic crystal and an electro-optic inorganic crystal.

5. The system of claim 1, wherein said terahertz source is one of: LiNbO$_3$ and Dimethyl Amino Sulfur Trifluoride.

6. The system of claim 1, wherein said terahertz source is one of: a <100>, a <110> and a <111> oriented crystals with a Zinc blende structure.

7. The system of claim 1, wherein said terahertz source is one of: GaAs, CdTE, InP, InAs and ZnTe.

8. The system of claim 1, wherein said pump source illuminates the terahertz source with femtosecond pulses.

9. The system of claim 1, wherein each wire has a diameter comprised in a range between 200 to 350 micrometers, and the wires are separated in free space by a distance ranging from 200 to 400 micrometers.

10. The system of claim 1, wherein the two-wire waveguide has a length comprised in a range between 5 and 30 cm.

11. A method for generating terahertz signals, comprising embedding a terahertz source between wires of a two-wire waveguide, and illuminating the terahertz source within the waveguide with a pump source, thereby generating terahertz signals directly inside the two-wire waveguide.

12. The method of claim 11, comprising selecting conductive wires for the two-wire waveguide, and wherein said embedding the terahertz source between the two wires of the two-wire waveguide comprises selecting a photoconductive antenna, said method further comprising applying a voltage bias directly to the wires of the two-wire waveguide.

13. The method of claim 11, comprising selecting conductive wires for the two-wire waveguide, wherein said embedding the terahertz source between the two wires of the two-wire waveguide comprises selecting a photoconductive antenna, said method further comprising applying a voltage bias directly to the wires of the two-wire waveguide, said applying a voltage bias directly to the wires of the two-wire waveguide comprising selecting a modulated, bipolar high voltage source adapted to supply up to 1000V.

14. The method of claim 11, wherein said embedding the terahertz source between the wires of the two-wire waveguide comprises selecting a non-linear material, said method comprising generating terahertz signals from the non-linear material by optical rectification.

15. The method of claim 11, wherein said embedding the terahertz source between the wires of the two-wire waveguide comprises selecting a non-linear material, said method comprising generating terahertz signals from the non-linear material by optical rectification, said non-linear material being one of: a <100>, a <110> and a <111> oriented crystals with a Zinc blende structure.

16. The method of claim 11, wherein said embedding the terahertz source between the wires of the two-wire waveguide comprises selecting a non-linear material, said method comprising generating terahertz signals from the non-linear material by optical rectification, said non-linear material being one of: GaAs, CdTE, InP, InAs and ZnTe.

17. The method of claim 11, wherein said embedding the terahertz source between the wires of the two-wire waveguide comprises selecting a non-linear material, said method comprising generating terahertz signals from the non-linear material by optical rectification, said non-linear material being one of: a non-linear inorganic electro-optic crystal and a non-linear organic electro-optic crystal.

18. The method of claim 11, wherein said embedding the terahertz source between the wires of the two-wire waveguide comprises selecting a non-linear material, said method comprising generating terahertz signals from the non-linear material by optical rectification, said non-linear material being one of: LiNbO$_3$ and Dimethyl Amino Sulfur Trifluoride.

19. The method of claim 11, wherein said embedding the terahertz source between the wires of the two-wire waveguide comprises selecting wires of a diameter comprised in a range between 200 to 350 micrometers and a length comprised in a range between 5 and 30 cm, and maintaining the wires separated from each other in free space by a distance ranging from 200 to 400 micrometers.

20. A terahertz source, embedded within a two-wire waveguide, said source being configured to be illuminated within the two-wire waveguide with a pump source for generating terahertz signals directly inside the two-wire waveguide.

* * * * *